United States Patent
Ohira et al.

(10) Patent No.: US 9,037,197 B2
(45) Date of Patent: May 19, 2015

(54) MOBILE TERMINAL, POWER TRANSFER SYSTEM AND COMPUTER-READABLE STORAGE MEDIUM

(75) Inventors: Masataka Ohira, Saitama (JP); Michiyo Kono, Nara (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/981,495

(22) PCT Filed: Oct. 14, 2011

(86) PCT No.: PCT/JP2011/005775
§ 371 (c)(1),
(2), (4) Date: Jul. 24, 2013

(87) PCT Pub. No.: WO2013/054386
PCT Pub. Date: Apr. 18, 2013

(65) Prior Publication Data
US 2013/0310117 A1    Nov. 21, 2013

(51) Int. Cl.
| | | |
|---|---|---|
| H04B 1/38 | (2006.01) |
| H04W 52/00 | (2009.01) |
| H02J 17/00 | (2006.01) |
| H02J 7/00 | (2006.01) |
| H04B 7/08 | (2006.01) |
| G06F 1/26 | (2006.01) |
| H04B 5/00 | (2006.01) |

(52) U.S. Cl.
CPC ............... *H04W 52/00* (2013.01); *H02J 17/00* (2013.01); *H02J 7/0054* (2013.01); *H04B 7/0805* (2013.01); *H04B 7/0848* (2013.01); *G06F 1/26* (2013.01); *H04B 5/0037* (2013.01)

(58) Field of Classification Search
CPC .. H04B 7/0814; H04B 7/0802; H04B 7/0805; H04B 7/0877; H01L 1/06
USPC ......... 455/573, 574, 343.2, 343.5; 340/855.8, 340/455, 636.1, 693.2
See application file for complete search history.

(56) References Cited

U.S. PATENT DOCUMENTS

| | | | |
|---|---|---|---|
| 5,960,330 A | * | 9/1999 | Azuma ............................. 455/70 |
| 6,738,439 B1 | * | 5/2004 | Okanoue et al. ............... 375/347 |
| 2002/0077153 A1 | * | 6/2002 | Chiba et al. .................... 455/562 |

(Continued)

FOREIGN PATENT DOCUMENTS

| | | |
|---|---|---|
| CN | 102132292 A | 7/2011 |
| EP | 2342796 A2 | 7/2011 |
| EP | 2332096 B1 | 4/2014 |

(Continued)

OTHER PUBLICATIONS

International Search Report from International Application No. PCT/JP2011/005775 mailed Feb. 28, 2012.

(Continued)

*Primary Examiner* — Mazda Sabouri
*Assistant Examiner* — Edward Zhang
(74) *Attorney, Agent, or Firm* — Brundidge & Stanger, P.C.

(57) ABSTRACT

A mobile terminal may include a plurality of antennas to receive radio waves, a receiver circuit to receive power of the radio waves received by the plurality of antennas using a diversity technique, and a charging unit to charge a rechargeable battery coupled to the mobile terminal by the power of the radio waves received by the receiver circuit.

20 Claims, 8 Drawing Sheets

(56) References Cited

U.S. PATENT DOCUMENTS

| | | | |
|---|---|---|---|
| 2010/0184371 | A1 | 7/2010 | Cook et al. |
| 2010/0190435 | A1 | 7/2010 | Cook et al. |

FOREIGN PATENT DOCUMENTS

| | | | |
|---|---|---|---|
| GB | 2422517 | A | 7/2006 |
| JP | 3033746 | B1 | 4/2000 |
| JP | 2000-151252 | A | 5/2000 |
| JP | 2005-151609 | A | 6/2005 |
| JP | 2009-165325 | A | 7/2009 |
| JP | 2010-0043424 | A | 1/2010 |
| JP | 2010-252497 | A | 11/2010 |
| JP | 2011-67072 | A | 3/2011 |
| WO | 2010/028092 | A1 | 3/2010 |
| WO | 2010025156 | A1 | 3/2010 |
| WO | 2010033727 | A2 | 3/2010 |

OTHER PUBLICATIONS

"Program on Technology Innovation: Impact of Wireless Power Transfer Technology", 2009.
"RF Energy Harvesting and Wireless Power", 2009.
"MIMO," Accessed at http://web.archive.org/web/20111004194716/http://en.wikipedia.org/wiki/MIMO, last modified on Sep. 24, 2011, pp. 5.
Kurs, A. et al., "Wireless Power Transfer via Strongly Coupled Magnetic Resonances," in Science Express, vol. 317 No. 5834, Jul. 6, 2007, pp. 83-86.

\* cited by examiner

MOBILE TERMINAL, POWER TRANSFER SYSTEM AND COMPUTER-READABLE STORAGE MEDIUM

CROSS-REFERENCE TO RELATED APPLICATIONS

This Application is a U.S. National Stage Application under 35 USC §371 claiming the benefit of International Application No. PCT/JP2011/005775, filed on Oct. 14, 2011.

TECHNICAL FIELD

The present disclosure relates to a mobile terminal, a power transfer system, and a computer-readable storage medium.

BACKGROUND ART

Mobile terminals, such as cellular phones, are useful communication tools. However, cellular phones, such as smartphones, may have a relatively large number of functions, and a battery powering the cellular phones may run out unexpectedly when various functions are utilized for a relatively long period of time, for example. When the battery runs out, the functions of the cellular phones may not be used unless the battery is replaced or the cellular phone is directly connected to a power supply.

Recently, there is active research and development in wireless power transfer. The wireless power transfer is also sometimes referred to as contactless power transfer. For example, by using the wireless power transfer, it may be possible to charge a battery of a mobile terminal, such as cellular phone, by merely placing the mobile terminal against or on a charging unit without physically and electrically connecting the mobile terminal to a power supply. However, since the charging of the battery does not occur unless the mobile terminal is placed close to the charging unit, this wireless power transfer may be unsuited for use during motion of the mobile terminal. The motion of the mobile terminal occurs when a user, a vehicle or the like carrying the mobile terminal moves.

Compared to the wireless power transfer described above having a power transfer distance on the order of several mm, for example, a first wireless power transfer system has been proposed in which the power transfer distance may be extended to 2 m, for example. This first wireless power transfer system is based on the principles of resonance using coils in order to enable an efficient power transfer. However, since the coil size needs to be increased in order to extend the power transfer distance, this first wireless power transfer system may be unsuited for implementation in portable devices, such as mobile terminals. In addition, in order to realize an efficient power transfer, a power transmitter in a transmitting end and a power receiver in the receiving end device may need to be oriented to oppose each other, which may limit the arrangement of the power transmitter, for example. Furthermore, the need to orient the power transmitter and the power receiver to oppose each other may make it difficult to transfer the power according to this first wireless power transfer system during motion of the mobile terminal.

On the other hand, a second wireless power transfer system has been proposed in which the power is transmitted and received by means of microwaves. As opposed to the first wireless power transfer system described above, this second wireless power transfer system may not limit the arrangement of power transmitter, for example, and the power receiver may receive power even during motion of the mobile terminal. However, according to this second wireless power transfer system, the power transfer efficiency may be considerably reduced compared to that of the first wireless power transfer system unless the beam width of either a transmitting antenna or a receiving antenna is narrowed. But narrowing the beam width of the transmitting or receiving antenna may make it more difficult for the mobile terminal to receive the microwaves during motion.

Moreover, according to the first and second wireless power transfer systems, the cost of setting up the power transmitters in an environment in which the mobile terminal is used may become considerably high when a relatively large number of power transmitters are to be set up in the environment.

Therefore, there may be demands for a wireless power transfer technology that may realize an efficient power transfer even during motion of the mobile terminal.

SUMMARY

One aspect of the embodiment may provide a technology for realizing an efficient power transfer even during motion of a mobile terminal.

According to another aspect of the embodiment, a mobile terminal may include a plurality of antennas configured to receive radio waves, a receiver circuit configured to receive power of the radio waves received by the plurality of antennas using a diversity technique, and a charging unit configured to charge a rechargeable battery coupled to the mobile terminal by the power of the radio waves received by the receiver circuit.

According to still another aspect of the embodiment, a power transfer system may include a mobile terminal, and a plurality of external devices configured to communicate with the mobile terminal, wherein the mobile terminal includes a plurality of antennas configured to receive radio waves from the external devices, a receiver circuit configured to receive power of the radio waves received by the plurality of antennas using a diversity technique, a charging unit configured to charge a rechargeable battery coupled to the mobile terminal by the power of the radio waves received by the receiver circuit, and a control unit configured to send a power transfer request with respect to the external devices via the plurality of antennas when a remaining capacity of the rechargeable battery is less than a predetermined value, wherein the control unit activates the charging unit when a notification notifying a start of a power transfer is received from one of the plurality of antennas in response to the power transfer request.

According to a further aspect of the embodiment, a non-transitory computer-readable storage medium that stores a program which, when executed by a computer, causes the computer to perform a power transfer process may include a receiving procedure causing the computer to receive power of radio waves received by a plurality of antennas using a diversity technique, and a charging procedure causing the computer to charge a rechargeable battery coupled to the mobile terminal by a charging unit using the power of the radio waves received by the receiver circuit.

The foregoing summary is illustrative only and is not intended to be in any way limiting. In addition to the illustrative aspects, embodiments, and features described above, further aspects, embodiments, and further features will be apparent from the following detailed description when read in conjunction with the accompanying drawings.

DETAILED DESCRIPTION

Figure 1:
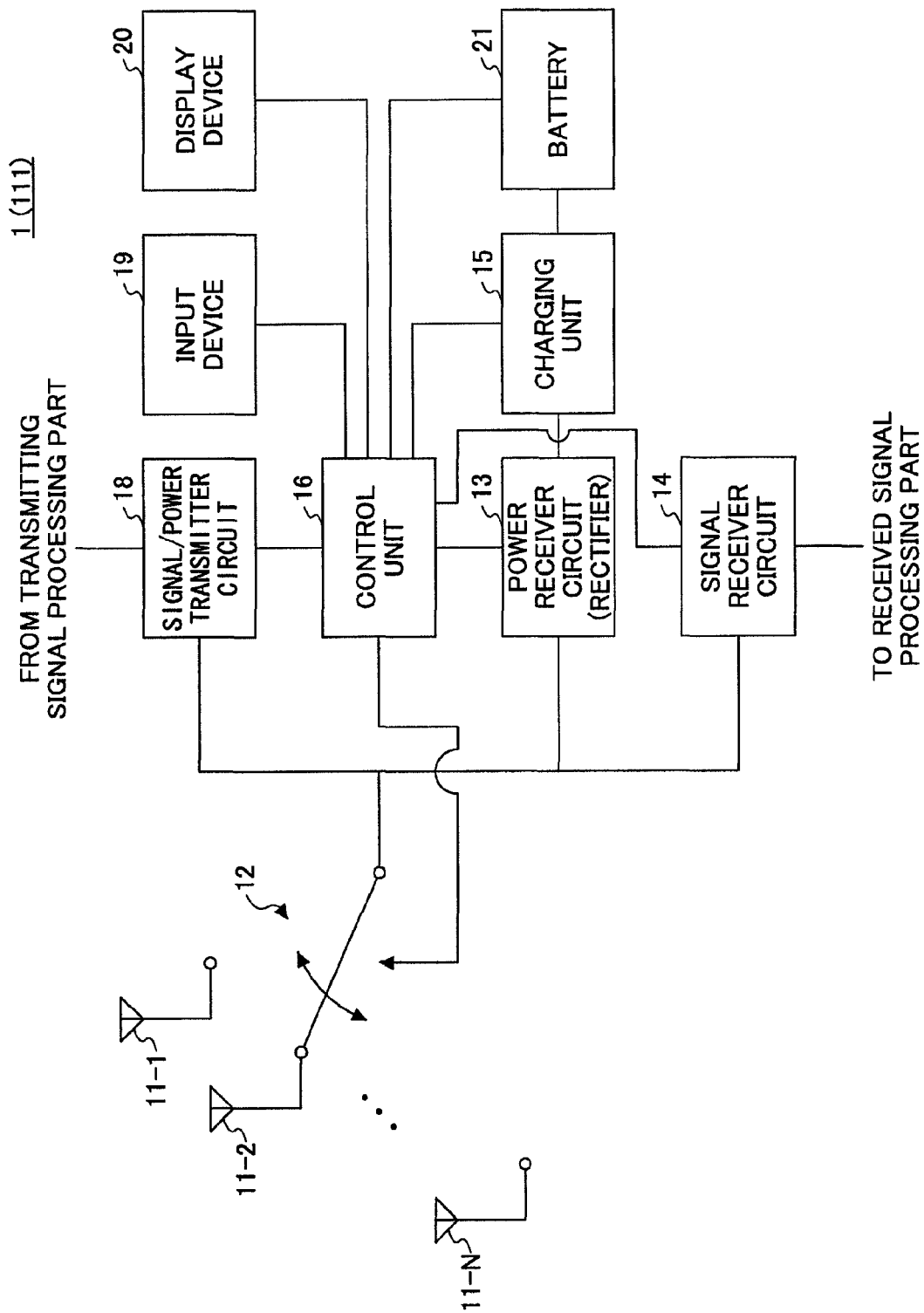
FIG. 1 is a block diagram illustrating an example of a mobile terminal in a first embodiment.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It may be readily understood that aspects of this disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, devices, systems, and/or computer-readable storage media related to power transfer.

Briefly stated, techniques are generally described herein for a wireless power transfer.

First Embodiment

FIG. 1 is a block diagram illustrating an example of a mobile terminal in a first embodiment. In one example, a mobile terminal 1 illustrated in FIG. 1 may be formed by a cellular phone, for example, but the mobile terminal 1 may be formed by any suitable device that includes a plurality of antennas to receive radio waves, a receiver circuit to receive power of the radio waves received by the plurality of antennas using a diversity technique, and a charging unit to charge a rechargeable battery coupled to the device by the power of the radio waves received by the receiver circuit. In the case of the cellular phone, a speaker and a microphone (both not illustrated) may be provided to enable a telephone conversation with another party.

The mobile terminal 1 illustrated in FIG. 1 may include a plurality of antennas 11-1 through 11-N (N is a natural number greater than 1), a switching circuit 12, a power receiver circuit 13, a signal receiver circuit 14, a charging unit 15, a control unit 16, a signal/power transmitter circuit 18, an input device 19, and a display device 20. A rechargeable battery 21 may be detachably connected to the charging unit 15.

The antennas 11-1 through 11-N may form an adaptive array antenna. A rectifier (not illustrated) may be provided within the power receiver circuit 13, for example. The control unit 16 may include a processor, such as a CPU (Central Processing Unit). The input device 19 may include a plurality of keys or buttons to be operated by a user when inputting instructions or data to the control unit 16 of the mobile terminal 1. The display device 20 may include a LCD (Liquid Crystal Display) or the like to display messages, data and the like to the user, under control of the control unit 16. The data displayed on the display device 20 may include an indication (or a battery fuel gauge) to indicate a remaining battery capacity (or remaining battery level or charge) for the battery 21. Of course, the input device 19 and the display device 20 may be formed by a single operation panel, such as a touchscreen panel which integrally includes functions of the input device 19 and the display device 20.

An amplifier (not illustrated), such as a PA (Power Amplifier), for example, may be provided within the signal/power transmitter circuit 18 or, may be provided between an output of the signal/power transmitter circuit 18 and the switching circuit 12. Similarly, an amplifier (not illustrated), such as a LNA (Low-Noise Amplifier), may be provided between the switching circuit 12 and an input of the signal receiver circuit 14 or, may be provided within the signal receiver circuit 14.

The control unit 16 may include the functions of controlling switching of the switching circuit 12, controlling the power receiver circuit 13 to receive power of radio waves received by the antennas 11-1 through 11-N via the switching circuit 12, controlling the signal receiver circuit 14 to receive requests and notifications received by the antennas 11-1 through 11-N via the switching circuit 12, and controlling the signal/power transmitter circuit 18 to transmit requests, notifications and power by radio waves from the antennas 11-1 through 11-N via the switching circuit 12. The control unit 16 may also include the functions of monitoring a remaining battery capacity of the battery 21 by a known method, and activating or deactivating the charging unit 15. In this example, the control unit 16 may further control the operation mode of the mobile terminal 1, including a standby mode, the power receiving mode, and a power transfer mode. For example, a telephone conversation, a data communication, and the like may be instructed by the user from the input device 19 in the standby mode. Power may be received from the external devices in the power receiving mode. Power may be transferred (or transmitted) to an external device in the power transfer mode.

The radio waves received by the power receiver circuit 13 may be converted into a signal that is used to charge the battery 21 via the charging unit 15, as will be described later. The radio waves received by the signal receiver circuit 14 may be supplied to a received signal processing part (not illustrated) that may form a receiving system together with the signal receiver circuit 14. The received signal processing part may subject the received radio waves to a processing such as demodulation. The signal/power transmitter circuit 18 may receive signals to be transmitted from a transmitting signal processing part (not illustrated) that may form a transmitting system together with the signal/power transmitter circuit 18. The transmitting signal processing part may subject the signals to be transmitted to a processing such as modulation.

Figure 2:
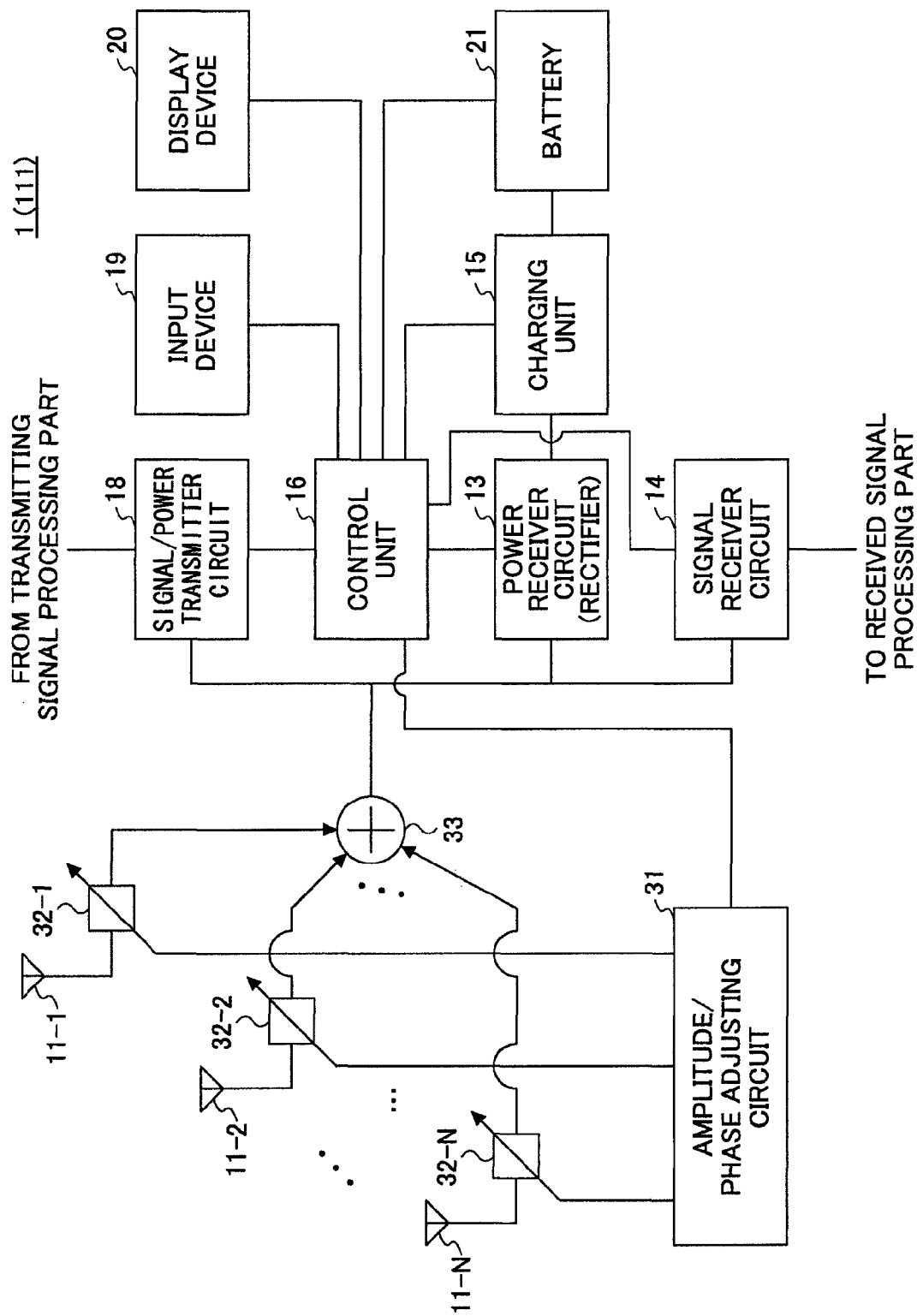
FIG. 2 is a block diagram illustrating another example of the mobile terminal in the first embodiment.

FIG. 2 is a block diagram illustrating another example of the mobile terminal in the first embodiment. In FIG. 2, those parts that are the same as those corresponding parts in FIG. 1 are designated by the same reference numerals, and a description thereof will be omitted.

In FIG. 2, the control unit 16 may control an amplitude and/or phase adjusting circuit 31 in place of the switching circuit 12 illustrated in FIG. 1. The amplitude and/or phase adjusting circuit 31 may control adjusters 32-1 through 32-N to adjust the amplitude and/or the phase of the radio waves received via the antennas 11-1 through 11-N, respectively. The radio waves, adjusted of the amplitude and/or the phase in the adjusters 32-1 through 32-N, may be supplied to a mixer 33 that may be connected to a node connecting the inputs of the receiver circuits 13 and 14 and the output of the signal/power transmitter circuit 18.

In the example illustrated in FIG. 1, the mobile terminal 1 that receives power may have the plurality of antennas 11-1 through 11-N, and the switching circuit 12 that may perform the switching of the antennas 11-1 through 11-N depending on the level of power received. Furthermore, in the power receiver circuit 13 on a downstream side of the switching circuit 12, the rectifier of the power receiver circuit 13 may convert high-frequency radio wave signals into a DC (Direct Current) signal that is used to charge the battery 21 via the charging unit 15.

In a multipath environment in which the radio waves from multiple external devices (for example, power transmitting mobile terminals 111) propagate, the receiving mobile terminal 1 may enter a null point depending on the location of the receiving mobile terminal 1, which may result in a relatively low power reception level at the power receiving mobile terminal 1. In order to avoid this situation, the power receiving mobile terminal 1 may be provided with the plurality of antennas 11-1 through 11-N, and the power reception levels at the individual antennas 11-1 through 11-N may be monitored by the control unit 16 via the power receiver circuit 13. The control unit 16 may control the switching circuit 12 to connect to the antenna having a highest power reception level or a power reception level higher than a threshold level. This may enable efficient reception of radio waves from multiple external devices (for example, power transmitting mobile terminals 111). By employing the diversity technique for selectively switching the antennas 11-1 through 11-N via the switching circuit 12 depending on the power reception levels as described above, it may be possible to stably perform a multipoint-to-point power transfer to and power reception by the power receiving mobile terminal 1. The diversity technique employed in FIG. 1 may be the so-called selection combining.

Alternatively, the so-called equal gain combining, in which the adjuster 32-$i$ ($i=1, \ldots, N$) may be provided in association with each antenna 11-$i$ to adjust the gain (or amplitude), may be employed to increase the power reception level at the power receiving terminal 1. The so-called in-phase combining, in which the adjuster 32-$i$ ($i=1, \ldots, N$) may be provided in association with each antenna 11-$i$ to adjust or shift the phase, may be employed to increase the power reception level at the power receiving terminal 1. Further, the so-called maximal-ratio combining, in which the adjuster 32-$i$ ($i=1, \ldots, N$) may be provided in association with each antenna 11-$i$ to adjust or shift the both the phase and the amplitude, may be employed to increase the power reception level at the power receiving terminal 1. The diversity technique employed in FIG. 2 may be any one of the equal gain combining, the in-phase combining, and the maximal-ratio combining.

Figure 3:
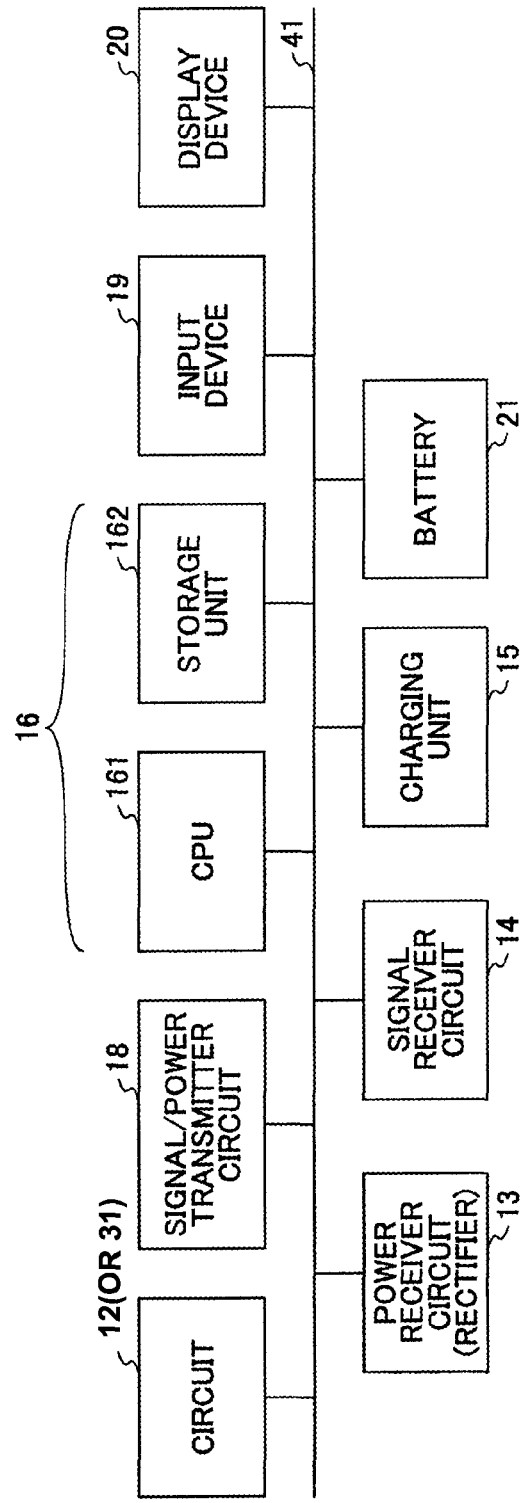
FIG. 3 is a block diagram illustrating a modification of a part of the mobile terminal.

FIG. 3 is a block diagram illustrating a modification of a part of the mobile terminal. In FIGS. 1 and 2, the control unit 16 may be connected separately to each of the switching circuit 12 or the amplitude and/or phase adjusting circuit 31, the receiver circuits 13 and 14, the charging unit 15, the signal/power transmitter circuit 18, the input device 19, the display device 20, and the battery 21.

On the other hand, in FIG. 3, the control unit 16 may be connected to each of the switching circuit 12 or the amplitude and/or phase adjusting circuit 31, the receiver circuits 13 and 14, the charging unit 15, the signal/power transmitter circuit 18, the input device 19, the display device 20, and the battery 21 via a bus 41. Further, the control unit 16 may include a CPU 161 and a storage unit 162. The storage unit 162 may store data and programs to be executed by the CPU 161. The storage unit 162 may be detachably connected to the bus 41. The storage unit 162 may be formed by any suitable non-transitory computer-readable storage medium, such as a semiconductor memory device, and a drive for a magnetic recording medium, a magneto-optical recording medium, an optical recording medium, and the like.

The programs stored in the storage unit 162 may include a program which, when executed by the CPU 161, causes the CPU 161 to perform a power transfer process that may include a receiving procedure causing the CPU 161 to receive power of radio waves received by the antennas 11-1 through 11-N using a diversity technique, and a charging procedure causing the CPU 161 to charge the battery 21 by the charging unit 15 using the power of the radio waves received by the power receiver circuit 13. The receiving procedure may cause the CPU 161 to receive a power transfer at a carrier frequency fc via the antennas 11-1 through 11-N, and the power transfer process may further include a procedure causing the CPU 161 to determine the diversity technique used by the receiving procedure in order to maximize a reception power level of a carrier wave with respect to noise depending on a remaining capacity of the battery 21.

The power transfer process may further include a control procedure causing the CPU 161 to make a power transfer, including making a notification to notify a start of the power transfer, via the antennas 11-1 through 11-N in response to receiving a power transfer request via the antennas 11-1 through 11-N.

Figure 4:
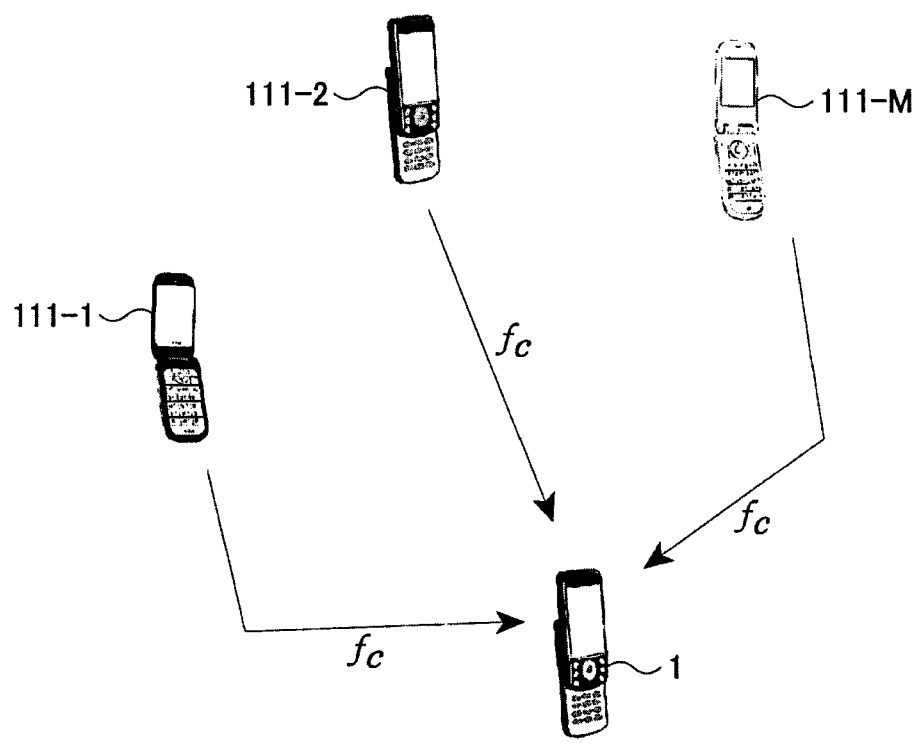
FIG. 4 is a diagram for explaining an example of a power transfer in the first embodiment.

FIG. 4 is a diagram for explaining an example of a power transfer in the first embodiment. In FIG. 4, it may be assumed for the sake of convenience that each of the power receiving mobile terminal 1 and power transmitting mobile terminals 111-1 through 111-M (M is a natural number greater than 1) in the power transfer system has the structure illustrated in FIG. 1 or FIG. 2, and the power transmitting mobile terminals 111-1 through 111-M are located within a communicatable range from the power receiving mobile terminal 1.

In contrast to the conventional system that may receive radio waves transmitted from a single power transmitter by a power receiver of a single mobile terminal, multiple power transmitting mobile terminals 111-1 through 111-M may cooperate to transmit radio wave energy to a single power receiving mobile terminal 1. That is, the multiple mobile terminals 111-1 through 111-M within the communicatable range from the power receiving mobile terminal 1 may be used as power transmitters for the power receiving mobile terminal 1.

Thus, compared to the relatively low efficiency of the conventional point-to-point (P2P) power transfer using the radio wave energy, the efficiency of the multipoint-to-point (MP2P) power transfer, that is, many-to-one power transfer, in accordance with the embodiment may be improved considerably. Even though the power transmitted from a single mobile terminal 111-$i$ may be relatively small, power sufficient to charge the battery 21 may be obtained by adding up the power received from the multiple mobile terminals 111-1 through 111-M. This type of power transfer system may be made possible by the plurality of antennas 11-1 through 11-N that basically enable reception of the radio waves from all directions (that is, arbitrary directions). The power transfer may be made using the carrier frequency fc of the carrier waves used for the communications among mobile terminals 111-1 through 111-1 and 1.

Figure 5:
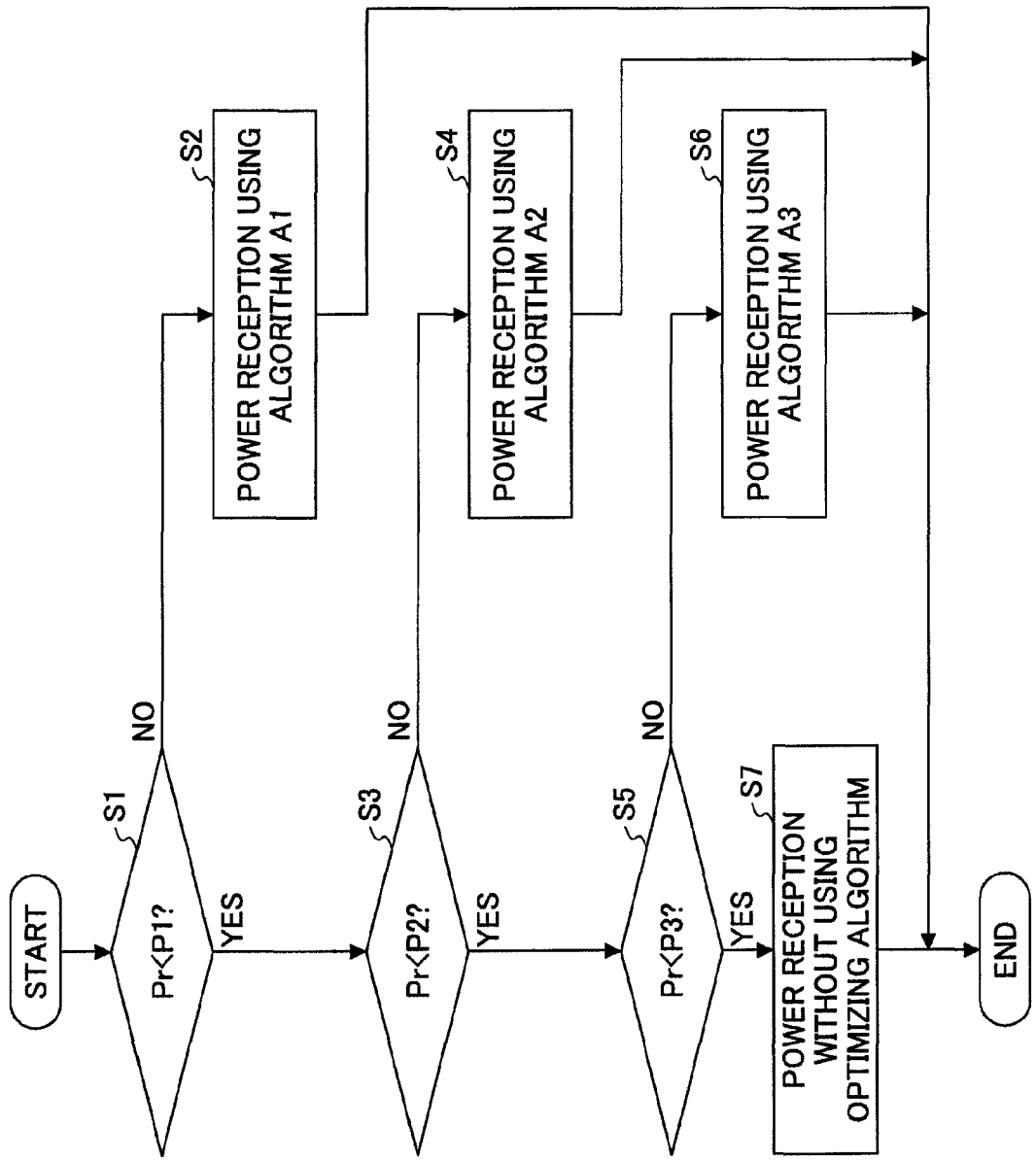
FIG. 5 is a flow chart for explaining an example of a process of varying an optimizing algorithm depending on a remaining battery capacity.

FIG. 5 is a flow chart for explaining an example of a process of varying an optimizing algorithm in the power receiving mobile terminal depending on a remaining battery capacity of the battery. The process illustrated in FIG. 5 may be performed by the control unit 16 of the power receiving mobile terminal 1.

In FIG. 5, a step S1 may decide whether a power Pr that may be supplied by the remaining battery capacity of the battery 21 is smaller than a power P1 required to perform a first optimizing algorithm A1 of the diversity technique. If the decision result in the step S1 is NO, a step S2 may perform a power reception using the first optimizing algorithm A1, and the process ends. On the other hand, if the decision result in the step S1 is YES, a step S3 may decide whether a power Pr that may be supplied by the remaining battery capacity is smaller than a power P2 required to perform a second optimizing algorithm A2 of the diversity technique. If the decision result in the step S3 is NO, a step S4 may perform a power reception using the second optimizing algorithm A2, and the process ends.

If the decision result in the step S3 is YES, a step S5 may decide whether a power Pr that may be supplied by the remaining battery capacity is smaller than a power P3 required to perform a third optimizing algorithm A3 of the diversity technique. If the decision result in the step S5 is NO, a step S6 may perform a power reception using the third optimizing algorithm A3, and the process ends. On the other hand, if the decision result in the step S5 is YES, a step S7 may perform a power reception without using the optimizing algorithm, and the process ends.

In this example, the first optimizing algorithm A1 may be more complex and require more time and power to execute compared to the second optimizing algorithm A2. In addition, the second optimizing algorithm A2 may be more complex and require more time and power to execute compared to the third optimizing algorithm A3. For example, the first, second, and third optimizing algorithms A1, A2, and A3 may be in conformance with the diversity techniques using selection combining, equal gain combining (or in-phase combining), and maximal-ratio combining, respectively. Therefore, according to the process illustrated in FIG. 5, a power reception using a simpler optimizing algorithm may be performed when the power providable by the remaining battery capacity is insufficient for performing a power reception using a more complex optimizing algorithm. As a result, the power reception may be made using the optimizing algorithm that suits the remaining battery capacity of the battery 21.

Of course, the optimizing algorithm that is used by the power receiving mobile terminal 1 may change dynamically depending on the charging of the battery 21 performed by the charging unit 15 that progresses based on the radio wave energy received from the power transmitting mobile terminals 111-1 through 111-M.

As described above, by performing the multipoint-to-point power transfer and providing the power receiving mobile terminal with arrayed antennas to receive the radio wave energy using the diversity technique as in this embodiment, an efficient wireless power transfer may be achieved.

Next, this embodiment will be described in more detail by referring to specific specifications of the mobile terminal.

The efficiency of the conventional point-to-point (P2P) power transfer using the radio wave energy, that is, the ratio of received power to transmitted power for the case where the power transmitter and the power receiver are disposed opposing each other, may be lower than the efficiency of power transfer systems based on magnetic resonance or the like which may be 50% to 98%. For this reason, the power transfer using the radio wave energy may have been conventionally regarded as not being suited for applications such as quick charging or stable long-term power feeding.

However, in an environment in which the multiple power transmitting mobile terminals 111-1 through 111-M exist, as illustrated in FIG. 4, for example, although the efficiency of the power transfer using the radio wave energy per mobile terminal may be the same as that of the conventional point-to-point (P2P) power transfer using the radio wave energy, the power transfer may increase in accordance with the number M of power transmitting mobile terminals 111-1 through 111-M and the power received by the power receiving mobile terminal 1 may increase accordingly.

In particular, in an area (or region) where users of the mobile terminals 1 and 111-1 through 111-M may be relatively densely populated, the distance between the power transmitting mobile terminal 111-i and the power receiving mobile terminal 1 may be relatively short, and the number M of power transmitting mobile terminals 111-1 through 111-M may be relatively large. Hence, an increase may be expected in the power received by the power receiving mobile terminal 1. Examples of the area (or region) described above may include a train, an office building, a factory, a city, and the like.

For example, suppose that the power transmitting mobile terminal 111 operates in the 800 MHz band and transmits power with a maximum output of 0.8 W (or approximately 29 dBm). Assuming that the antenna gains of the power transmitting mobile terminal 111 and the power receiving mobile terminal 1 are both 0 dBi and the distance between the power transmitting mobile terminal 111 and the power receiving mobile terminal 1 is 10 m, for example, the power received by the power receiving mobile terminal 1 may be −21 dBm in the case of the point-to-point power transfer, and thus, the efficiency of the power transfer may be approximately 0.9%. It may be regarded that most of the energy is radiated to the surroundings of the power transmitting mobile terminal 111 as radio waves and little energy may reach the power receiving mobile terminal 1. However, when ten (10) power transmitting mobile terminals 111-1 through 111-10 are in the communicatable range from the power receiving mobile terminal 1 and have the same specifications as the power transmitting mobile terminal 111-i described above, for example, the power received by the power receiving mobile terminal 1 by the multipoint-to-point (10:1 in this example) power transfer may increase by approximately 10 dB. Hence, when M power transmitting mobile terminals 111-1 through 111-M having the specifications described above are located in the communicatable range from the power receiving mobile terminal 1, the power transfer to the power receiving mobile terminal 1 may increase by $10 \log_{10} M$ dB.

In an actual environment, however, the multiple radio waves from the plurality of power transmitting mobile terminals 111-1 through 111-M may not be received and combined ideally in phase. Thus, by employing the diversity technique at the power receiving mobile terminal 1 illustrated in FIG. 2 or FIG. 3, the amplitudes and/or phases of radio waves received by the individual antennas 11-1 through 11-M may be adjusted in accordance with the radio wave environment when combining received power, in order to stabilize the power that may be received. Since the power transfer may be performed at the carrier frequency fc of the carrier waves, the amplitudes and/or phases of the radio waves may be adjusted to maximize the power reception level of the carrier waves relative to noise or, SNR (Signal-to-Noise Ratio). This adjustment of the amplitudes and/or phases of the radio waves may be made using the optimizing algorithm of diversity technique. One example of improving the SNR in relation to the number of antennas of the mobile terminal is proposed in a Japanese Laid-Open Patent Publication No. 2010-252497, for example. Hence, in the power transfer system in accordance with this embodiment, the radio waves may be received stably by the power receiving mobile terminal 1 using the diversity technique, and the energy of radio waves transmitted from the power transmitting mobile terminals 111-1 through 111-M located in the communicatable range from the power receiving mobile terminal 1 may be accumulated by the power receiving mobile terminal 1 over a predetermined time by using the accumulated energy to charge the battery 21 by the charging unit 15.

Second Embodiment

Figure 6:
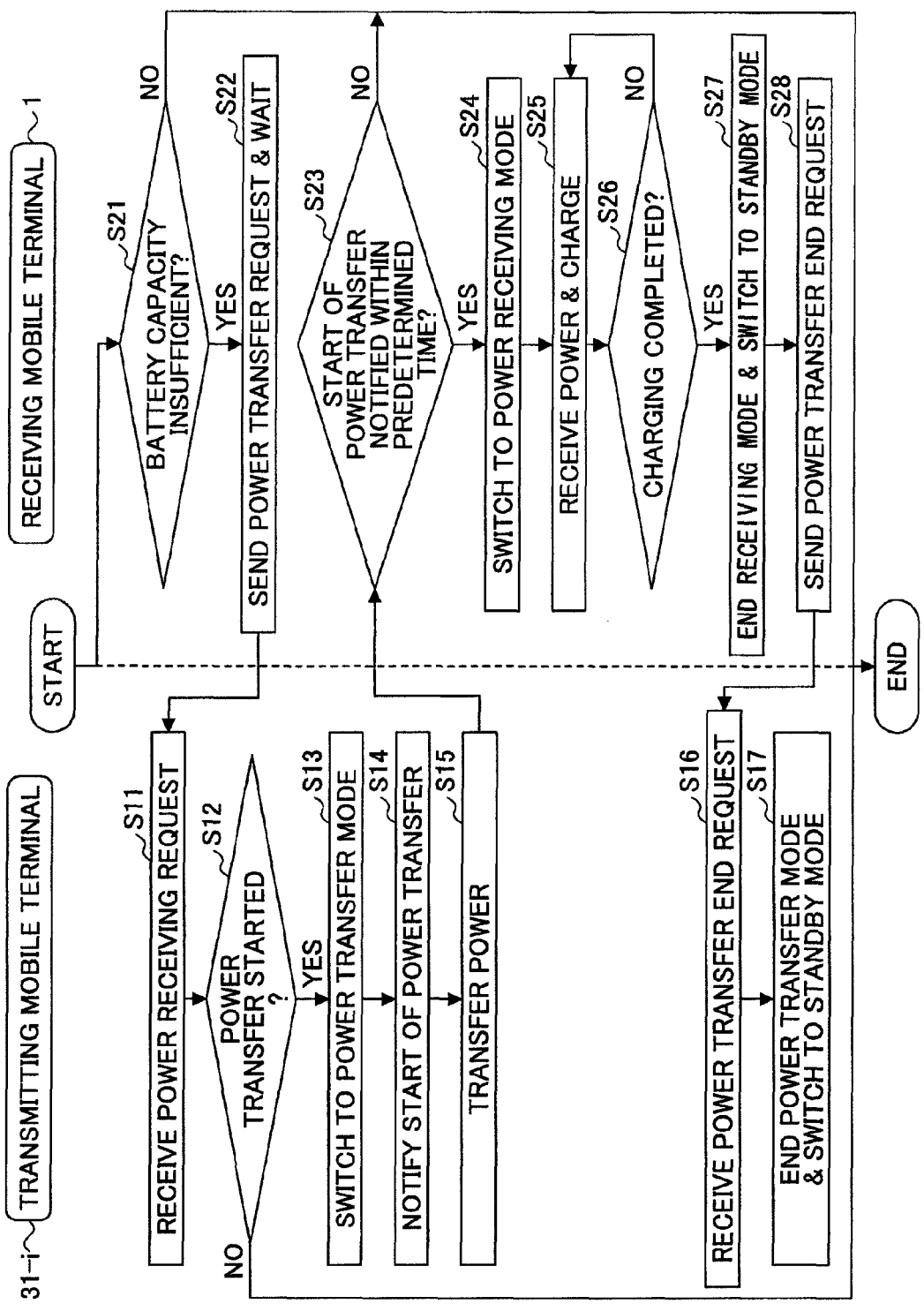
FIG. 6 is a flow chart for explaining an example of a process performed by a power transfer system in a second embodiment.
Figure 7:
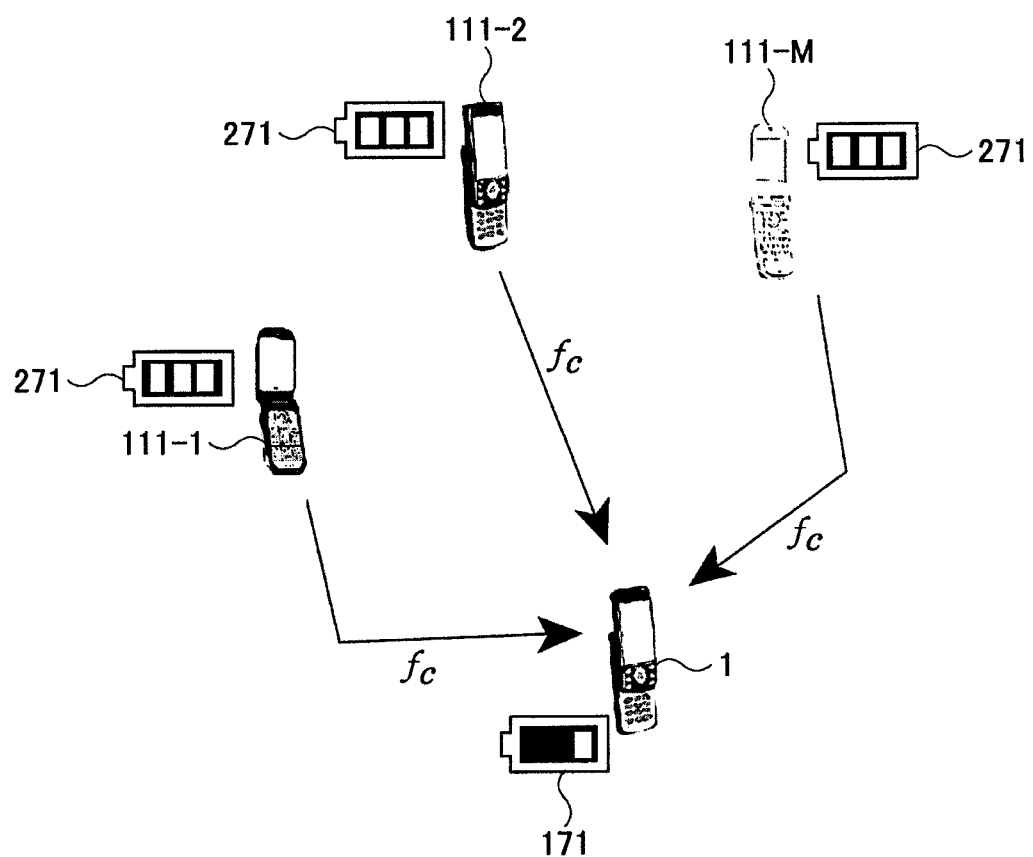
FIG. 7 is a diagram for explaining an example of a power transfer in the second embodiment.
Figure 8:
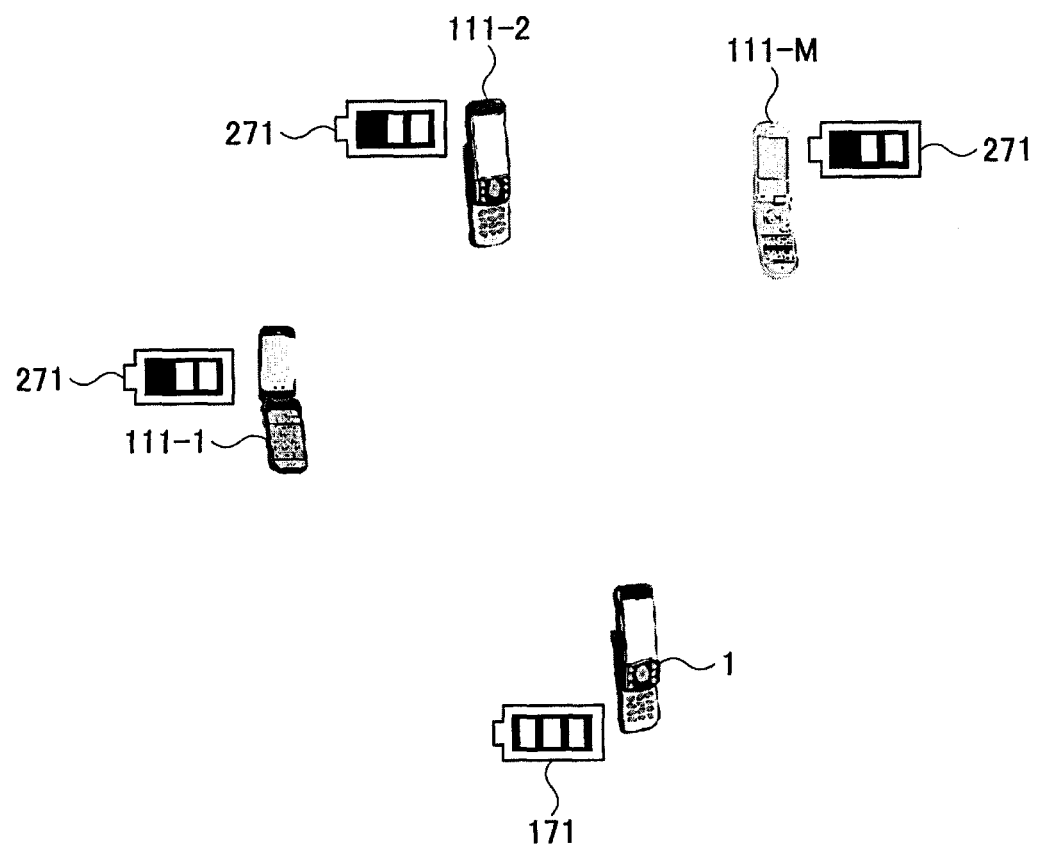
FIG. 8 is a diagram for explaining an example of a state after the power transfer in the second embodiment, all arranged in accordance with at least some embodiments of the present disclosure.

FIG. 6 is a flow chart for explaining an example of a process performed by a power transfer system in a second embodiment. FIG. 7 is a diagram for explaining an example of a power transfer in the second embodiment, and FIG. 8 is a diagram for explaining an example of a state after the power transfer in the second embodiment. In FIGS. 7 and 8, it may be assumed for the sake of convenience that each of a power receiving mobile terminal 1 and power transmitting mobile terminals 111-1 through 111-M (M is a natural number greater than 1) has the structure illustrated in FIG. 1 or FIG. 2, and the power transmitting mobile terminals 111-1 through 111-M are located within a communicatable range from the power receiving mobile terminal 1. Further, it may be assumed for the sake of convenience that a battery fuel gauge 271 is displayed on the display device 20 of each of the mobile terminals 1 and 111-1 through 111-M.

In FIG. 6, steps S11 through S17 may be executed by the control unit 16 (or CPU 161) of a power transmitting mobile terminal 111-$i$ (i=1, . . . , M), and steps S21 through S28 may be executed by the control unit 16 (or CPU 161) of the power receiving mobile terminal 1.

In the step S21, the power receiving mobile terminal 1 may decide whether the remaining battery capacity of the battery 21 is less than a predetermined amount and insufficient. If the remaining battery capacity of the power receiving mobile terminal 1 is low as indicated by the battery fuel gauge 271 thereof in FIG. 7 and the decision result in the step S21 is YES, the power receiving mobile terminal 1 may send a power transfer request to the power transmitting mobile terminals 111-1 through 111-M within the communicatable range from the power receiving mobile terminal 1, via the signal/power transmitter circuit 18, the switching circuit 12 (or the mixer 33 and the adjusters 32-1 through 32-N) and the antennas 11-1 through 11-N, and wait for a notification notifying a start of a power transfer, in the step S22.

In the step S11, the power transmitting mobile terminal 111-$i$ may receive the power transfer request from the power receiving mobile terminal 1, via the antennas 11-1 through 11-N, the switching circuit 12 (or the adjusters 32-1 through 32-N and the mixer 33), and the signal receiver circuit 14. In the step S12, the power transmitting mobile terminal 111-$i$ may decide whether the power transfer may be started, based on whether the remaining battery capacity of the battery 21 in the power transmitting mobile terminal 111-$i$ is greater than a predetermined amount. The process of the power transmitting mobile terminal 111-$i$ ends if the decision result in the step S12 is NO. On the other hand, if the remaining battery capacity of the power receiving mobile terminal 111-$i$ is high as indicated by the battery fuel gauge 271 thereof for i=1, 2 and M in FIG. 7 and the decision result in the step S12 is YES, the power transmitting mobile terminal 111-$i$ may switch the operation mode thereof to the power transfer mode, in the step S13. In the step S14, the power transmitting mobile terminal 111-$i$ in the power transfer mode may send the notification notifying the start of the power transfer to the power receiving mobile terminal 1, via the signal/power transmitter circuit 18, the switching circuit 12 (or the mixer 33 and the adjusters 32-1 through 32-N) and the antennas 11-1 through 11-N. In the step S15, the power transmitting mobile terminal 111-$i$ may transmit power by means of radio wave energy, via the signal/power transmitter circuit 18, the switching circuit 12 (or the mixer 33 and the adjusters 32-1 through 32-N) and the antennas 11-1 through 11-N.

In the step S23, the power receiving mobile terminal 1 may decide whether the start of the power transfer is notified from the power transmitting mobile terminal 111-$i$ via the antennas 11-1 through 11-N, the switching circuit 12 (or the adjusters 32-1 through 32-N and the mixer 33), and the signal receiver circuit 14, within a predetermined time. If the decision result in the step S23 is YES, the power receiving mobile terminal 1 may switch the operation mode thereof to the power receiving mode in which the charging unit 15 is activated, in the step S24. In the step S25, the power receiving mobile terminal 1 may receive the power, that is, the radio wave energy transmitted from the power transmitting mobile terminal 111-$i$, via the antennas 11-1 through 11-N, the switching circuit 12 (or the adjusters 32-1 through 32-N and the mixer 33), and the power receiver circuit 13, and charge the battery 21 via the charging unit 15.

In the step S26, the power receiving mobile terminal 1 may decide whether the charging of the battery 21 by the charging unit 15 is completed. The completion of the charging of the battery 21 may be detected by any suitable known method, such as a method that detects the completion of the charging based on the voltage supplied from the battery 21. The process may return to the step S25 if the decision result in the step S26 is NO. On the other hand, if the remaining battery capacity of the power receiving mobile terminal 1 is high as indicated by the battery fuel gauge 271 thereof in FIG. 8 and decision result in the step S26 is YES, the power receiving mobile terminal 1 may end the power receiving mode and switch the operation mode thereof to the standby mode in which the charging unit 15 is deactivated, in the step S27. In the step S28, the power receiving mobile terminal 1 may send a power transfer end request to the power transmitting mobile terminal 111-$i$, via the signal/power transmitter circuit 18, the switching circuit 12 (or the mixer 33 and the adjusters 32-1 through 32-N) and the antennas 11-1 through 11-N.

In the step S16, the power transmitting mobile terminal 111-$i$ in the power transfer mode may receive the power transfer end request from the power receiving mobile terminal 1, via the antennas 11-1 through 11-N, the switching circuit 12 (or the adjusters 32-1 through 32-N and the mixer 33), and the signal receiver circuit 14. In the step S17, the power transmitting mobile terminal 111-$i$ may end the power transfer mode and switch the operation mode thereof to the standby mode. The process of the power transmitting mobile terminal 111-$i$ ends after the step S17. As a result of the power transfer to the power receiving mobile terminal 1, the remaining battery capacity of the power transmitting mobile terminal 111-$i$ may become lower than its original level illustrated in FIG. 7, as indicated by the battery fuel gauge 271 thereof for i=1, 2 and M in FIG. 8. However, the decrease in the remaining battery capacity of the power transmitting mobile terminal 111-1 through 111-M may become smaller as the value of M increases.

On the other hand, if the decision result in the step S21 or the step S23 is NO, the process of the power receiving mobile terminal 1 ends.

By transmitting the power from the mobile terminals 111-1 through 111-M to the mobile terminal 1, the energy of batteries 21 may be shared among the group of mobile terminals 1 and 111-1 through 111-M, as illustrated in FIGS. 7 and 8. When the remaining battery capacity (or battery level) of the mobile terminal 1 becomes insufficient for performing a certain task or operation, the mobile terminal 1 may switch to the power receiving mode and send the power transfer request to the mobile terminals 111-1 through 111-M in the communicatable range from the mobile terminal 1 in order to notify the low battery level of the mobile terminal 1 to the mobile terminals 111-1 through 111-M. Upon receiving the power transfer request, each of the mobile terminals 111-1 through 111-M having a sufficiently high battery level may switch to the power transfer mode in order to transmit power to the mobile terminal 1. On the other hand, each of the mobile terminals 111-1 through 111-M having the low battery level may switch to the power receiving mode in order to receive the power from the mobile terminals other than itself and having the high battery level. Hence, the mobile terminals 1 and 111-1 through 111-M may in effect share information related to the battery levels thereof.

The disclosed embodiments are not limited to the application using the carrier frequency fc of the carrier waves used by cellular phones for the power transfer in order to achieve wireless sharing of energy of the batteries among the mobile terminals. In other words, the devices external to the power receiving mobile terminal may be stationary or fixed. For example, stationary base stations of wireless LANs may function as the external devices transmitting the power to the power receiving mobile terminal. In this case, the power receiving mobile terminal may not be provided with the function to transfer power to an external device, and the base station may not be provided with a charging unit to charge a battery. Furthermore, in the case where the position of the power receiving mobile terminal may be detected, each external device transmitting the power to the power receiving mobile terminal may be provided with arrayed antennas and form beams in the direction of the power receiving mobile terminal, in order to improve the efficiency of the power transfer correspondingly to an increase in gain of the power reception level at the power receiving mobile terminal.

Of course, the power receiving mobile terminal may receive the power transmitted from a mixture of power transmitting mobile terminals and power transmitting external devices that are stationary or fixed. In other words, the power receiving mobile terminal may receive the power transmitted from the power transmitting mobile terminals and/or the power transmitting external devices that are stationary or fixed.

According to the disclosed embodiments, since multiple external devices may transmit the power to a single power receiving mobile terminal, the power received by the power receiving mobile terminal may increase as the number of external devices transmitting the power increases. In addition, when mobile terminals or existing base stations are used as the external devices to transmit the power to the power receiving mobile terminal, it may not be necessary to newly provide equipments such as power transmitters for the wireless power transfer. Furthermore, because the power receiving mobile terminal may be provided with a plurality of antennas and employ the diversity technique, the power may be received stably even if the radio wave environment changes. This suits the power transfer system for making the power transfer to the power receiving mobile terminal in motion.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/-communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A mobile terminal comprising:
    a plurality of antennas configured to receive radio waves;
    a receiver circuit configured to receive power of the radio waves received by the plurality of antennas using a diversity technique to selectively switch from among the plurality of antennas to connect to a respective one of the plurality of antennas having a highest power reception level;
    a charging unit configured to charge a rechargeable battery coupled to the charging unit by the power of the radio waves received by the respective one of the plurality of antennas having the highest power reception level; and
    a control unit configured to send a power transfer request via the plurality of antennas in accordance with a remaining capacity of the rechargeable battery less than a predetermined value.

2. The mobile terminal as claimed in claim 1, wherein the control unit is configured to activate the charging unit in response to a notification notifying a start of a power transfer received from one of the plurality of antennas.

3. The mobile terminal as claimed in claim 2, wherein the control unit is configured to deactivate the charging unit and send an end request requesting an end of the power transfer via the plurality of antennas in accordance with the remaining capacity of the rechargeable battery greater than or equal to the predetermined value.

4. The mobile terminal as claimed in claim 1,
    wherein the receiver circuit is configured to receive a power transfer at a carrier frequency via the plurality of antennas; and
    wherein the control unit is configured to determine the diversity technique used by the receiver circuit in accordance with maximizing a reception power level of a carrier wave with respect to noise depending on the remaining capacity of the rechargeable battery.

5. The mobile terminal as claimed in claim 1,
    wherein the control unit is configured to make a power transfer, including making a notification to notify a start of the power transfer, via the plurality of antennas in response to receiving the power transfer request via the plurality of antennas.

6. The mobile terminal as claimed in claim 1, further comprising:
    a switching circuit configured to switch an output therefrom in response to a control signal in order to selectively output a radio wave having a highest reception power level among the radio waves received by the plurality of antennas;
    wherein the control unit is configured to control the switching circuit by supplying thereto the control signal.

7. The mobile terminal as claimed in claim 1, further comprising:
    an adjusting circuit configured to adjust at least one of an amplitude and a phase of the radio waves received by the plurality of antennas in response to a control signal in order to selectively output a radio wave having a highest reception power level among the radio waves received by the plurality of antennas;
    wherein the control unit is configured to control the adjusting circuit by supplying thereto the control signal.

8. The mobile terminal as claimed in claim 1, wherein the plurality of antennas form an adaptive array antenna.

9. A power transfer system comprising:
    a mobile terminal; and
    a plurality of external devices configured to communicate with the mobile terminal,
    wherein the mobile terminal comprises:
        a plurality of antennas configured to receive radio waves from the external devices;
        a receiver circuit configured to receive power of the radio waves received by the plurality of antennas using a diversity technique to selectively switch from among the plurality of antennas to connect to a respective one of the plurality of antenna having a highest power reception level;

a charging unit configured to charge a rechargeable battery coupled to the charging unit by the power of the radio waves received by the respective one of the plurality of antennas having the highest power reception level; and a control unit configured to send a power transfer request with respect to the external devices via the plurality of antennas in accordance with a remaining capacity of the rechargeable battery less than a predetermined value, and to activate the charging unit in response to a notification notifying a start of a power transfer received from one of the plurality of antennas in response to the power transfer request.

10. The power transfer system as claimed in claim 9, wherein the control unit of the mobile terminal is configured to deactivate the charging unit thereof and to send an end request requesting an end of the power transfer via the plurality of antennas in accordance with the remaining capacity of the rechargeable battery greater than or equal to the predetermined value.

11. The power transfer system as claimed in claim 9, wherein the control unit of the mobile terminal is configured to determine the diversity technique used by the receiver circuit in accordance with maximizing a reception power level of a carrier wave with respect to noise depending on the remaining capacity of the rechargeable battery.

12. The power transfer system as claimed in claim 9, wherein the control unit of the mobile terminal is configured to make a power transfer, including making a notification to notify a start of power transfer, via the plurality of antennas in response to receiving a power transfer request via the plurality of antennas.

13. The power transfer system as claimed in claim 9, wherein the control unit of the mobile terminal is configured to activate the charging unit in response to the notification notifying the start of the power transfer received from one of the plurality of antennas within a predetermined time from sending the power transfer request.

14. A non-transitory computer-readable storage medium that stores a program which, when executed by a computer, causes the computer to perform power transfer operations comprising:

receiving power of radio waves received by a plurality of antennas using a diversity technique to selectively switch from among the plurality of antennas to connect to a respective one of the plurality of antennas having a highest power reception level;

charging a rechargeable battery coupled to a charging unit by the charging unit using the power of the radio waves received by the respective one of the plurality of antennas having the highest power reception level; and sending a power transfer request via the plurality of antennas in accordance with a remaining capacity of the rechargeable battery less than a predetermined value.

15. The non-transitory computer-readable storage medium as claimed in claim 14, wherein the program, when executed by a computer, causes the computer to perform power transfer operations further comprising:

activating the charging unit in response to a notification notifying a start of a power transfer received from one of the plurality of antennas.

16. The non-transitory computer-readable storage medium as claimed in claim 15, wherein the program, when executed by a computer, causes the computer to perform power transfer operations further comprising:

deactivating the charging unit and sending an end request requesting an end of the power transfer via the plurality of antennas in accordance with the remaining capacity of the rechargeable battery greater than or equal to the predetermined value.

17. The non-transitory computer-readable storage medium as claimed in claim 14, wherein the program, when executed by a computer, causes the computer to perform power transfer operations further comprising:

activating a power transfer at a carrier frequency via the plurality of antennas; and determining the diversity technique in accordance with maximizing a reception power level of a carrier wave with respect to noise depending on the remaining capacity of the rechargeable battery.

18. The non-transitory computer-readable storage medium as claimed in claim 14, wherein the program, when executed by a computer, causes the computer to perform power transfer operations further comprising:

making a power transfer, including making a notification to notify a start of the power transfer, via the plurality of antennas in response to receiving the power transfer request via the plurality of antennas.

19. The mobile terminal as claimed in claim 1, wherein the diversity technique comprises at least one of an equal gain combining, an in-phase combining, or a maximal-ratio combining.

20. The power transfer system as claimed in claim 9, wherein the diversity technique comprises at least one of an equal gain combining, an in-phase combining, or a maximal-ratio combining.

* * * * *